UNITED STATES PATENT OFFICE.

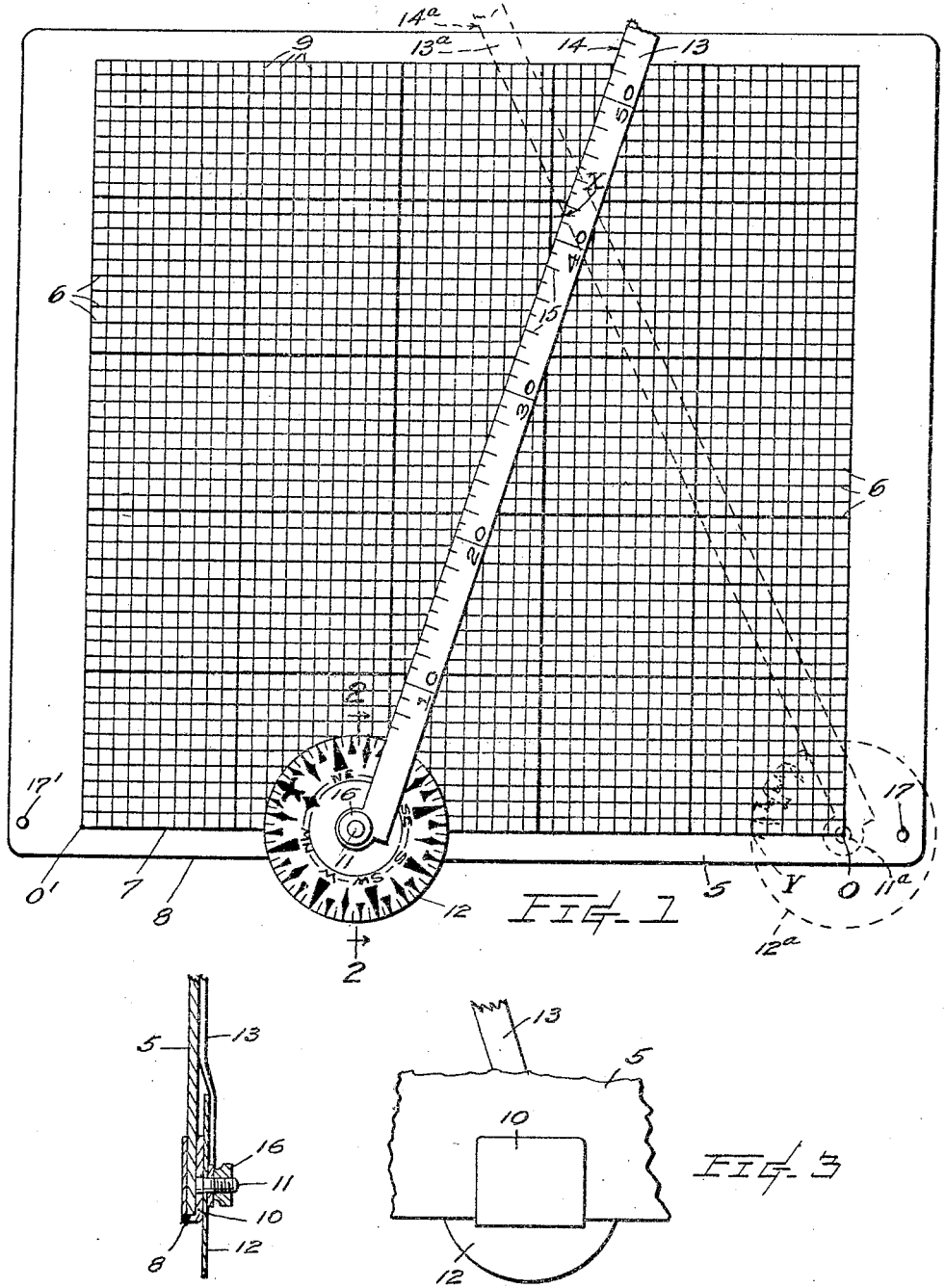

NELS L. CARLSON, OF BELLEVUE, WASHINGTON.

INSTRUMENT FOR LOCATING SHIPS' POSITIONS.

1,294,768.  Specification of Letters Patent.  Patented Feb. 18, 1919.

Application filed June 6, 1918. Serial No. 238,452.

*To all whom it may concern:*

Be it known that I, NELS L. CARLSON, a citizen of the United States, residing at Bellevue, in the county of King and State of Washington, have invented certain new and useful Improvements in Instruments for Locating Ships' Positions, of which the following is a specification.

This invention relates to improvements in instruments employed in navigating marine vessels; and its object is to provide devices whereby the location of a vessel may be readily determined with respect to a light house or other fixed object whose position is known.

The invention consists in the novel construction, adaptation and combination of parts as will be hereinafter described and claimed.

In the accompanying drawings, Figure 1 is a plan view of an instrument embodying the present invention. Fig. 2 is a sectional view through 2—2 of Fig. 1. Fig. 3 is a fragmentary rear elevation of the device.

On said drawings, the reference numeral 5 designates a rectangular plate, preferably of celluloid or other material from which pencil marks may be readily erased. Said plate as illustrated is provided with a series of transverse lines 6 arranged according to a suitable scale and parallel to a base line 7 and the lower edge 8 of the plate.

Also provided on the plate is a series of parallel longitudinal lines 9 disposed in spaced relations corresponding to the above mentioned scale.

10 represents a bifurcated block slidably mounted on the lower portion of the plate 5 for movements transverse thereof. Rigidly secured to or formed integral with said block is a pin 11 having its axis coincide with the base line 7 when the bottom of the block slot is in juxtaposition with the plate edge 8.

Rotatably mounted on the pin 11 and directly above said block is a circular card 12 having marked thereon the points or rhumbs of a mariner's compass. 13 represents an arm pivotally connected to said pin above the compass card, the center of the pivot being in alinement with an edge 14 of the arm.

Provided on said arm is a scale 15 corresponding with the scales of the aforesaid plate lines 6 and 9, the zero point of scale 15 being at the axis of the pivot pin 11. 16 represents a nut engaging screw threads provided on said pin for the purpose of securing the compass card and arm in adjusted positions to the block 10.

Adjacent to the side edges of plate 5 the latter is provided with upwardly protruding studs 17, $17^1$ disposed to serve as stops to arrest the block 10 to have the axis of pin 11 at zero points 0 or $0^1$ when the block has been moved to the extent of its travel in either lateral direction.

The operation of the invention may be explained by the following example, reference being had to Fig. 1.

Assuming that the position of a vessel is to be determined with reference to a stationary object, such as a light house, and that the vessel is traveling in a course northwest by west. The block 10 is shifted first to bear against the stud 17, the compass card indicated by dotted lines $12^a$ is then rotated to have the point Y (N W b W) register with the base line 7, and the arm indicated by $13^a$ is swung to have its edge $14^a$ which is radial of the axis of pin $11^a$ in a compass direction corresponding to that in which it bears from the vessel, say, N E b N whereupon a pencil mark is made on the plate 5 along the arm edge $14^a$. The block 10 and attachments are then moved transversely of the plate for a scale distance equal to the distance traveled by the vessel, as determined by the log and the time which elapses to when a second observation is to be taken.

With the card 12 in its previously adjusted rotary position, or changed to agree with any variation in the vessel's course, the arm 13 is swung with respect to the card to be in a compass direction corresponding to that at which the object is found to be, as E b N. A pencil mark is thereupon made along the edge 14 of arm 13 which will intersect the line previously drawn at a point denoted by X.

Taking then the distance from the object as indicated by the scale on said arm it is found that the vessel at the time of taking the second observation was S W b S of the object 4.15 miles.

The lines 6 and 9 on the plate may be employed most conveniently supplemental to the arm 13 and compass card. For instance an observation is taken from 0 or $0^1$ for adjusting the arm with respect to the card and, after proceeding on a course until the object is sighted rectangularly thereto; the distance traveled by the vessel may then be determined by the scale of the spacing of the longitudinal lines 9, and the distance of the vessel from the object by the scale of transverse lines, while its direction is readily determined by an inspection of the compass card.

What I claim, is—

1. An instrument of the class described comprising a plate, a block connected to said plate for transverse movements, a pin secured to said block, a card rotatably mounted on said pin and provided with marks indicating compass points, and an arm pivotally connected to said pin and having one of its edges arranged radially of the pin axis, said arm being provided with a scale measured from said pin axis.

2. An instrument of the class described comprising a plate, a block connected to said plate for transverse movements, a screw threaded pin secured to said block, a card rotatably mounted on said pin and provided with marks indicating compass points, and an arm pivotally connected to said pin and having one of its edges arranged radially of the pin axis, said arm being provided with a scale measured from said pin axis, and a nut engaging the threads of said pin for securing the arm and compass card in adjusted positions with respect to said block.

Signed at Seattle, Washington, this 21st day of May 1918.

NELS L. CARLSON.

Witnesses:
PIERRE BARNES,
HANNAH JONES.

Copies of this patent may be obtained for five cents each, by addressing the "Commissioner of Patents, Washington, D. C."